April 1, 1947. H. ZIEBOLZ 2,418,388
APPARATUS FOR CONTROLLING PRIMARY AND SECONDARY FUELS
Filed May 25, 1943 2 Sheets-Sheet 1

Inventor
H. Ziebolz.
By A. D. Adams
Attorney

April 1, 1947.    H. ZIEBOLZ    2,418,388
APPARATUS FOR CONTROLLING PRIMARY AND SECONDARY FUELS
Filed May 25, 1943    2 Sheets—Sheet 2
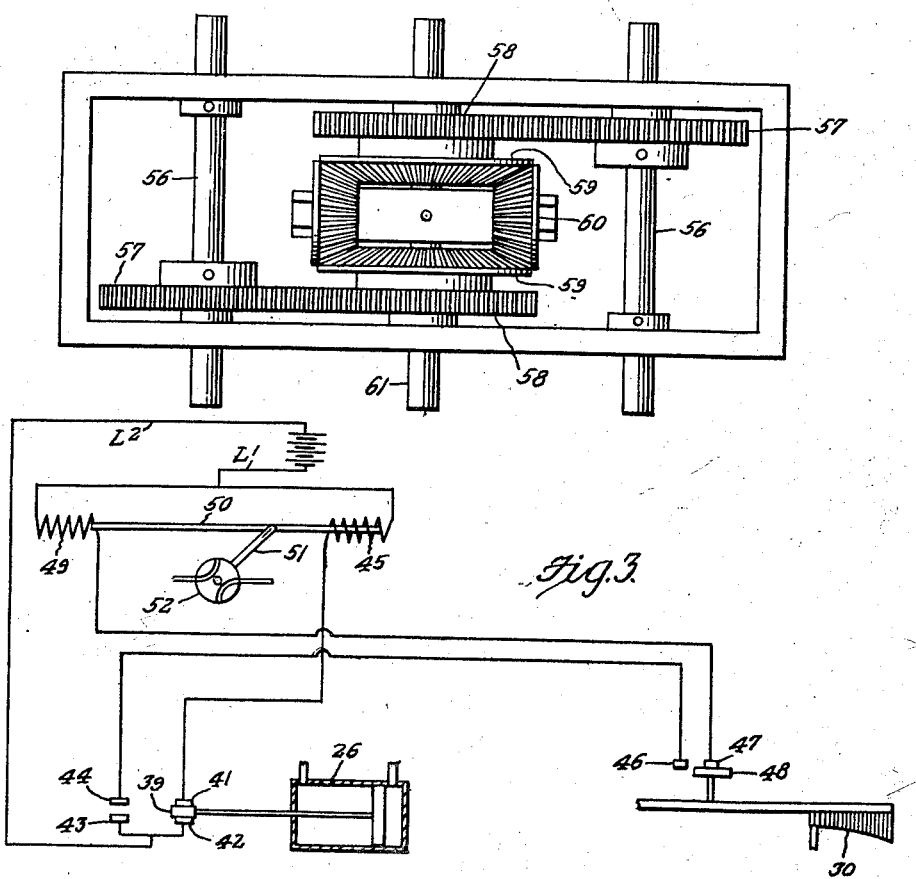
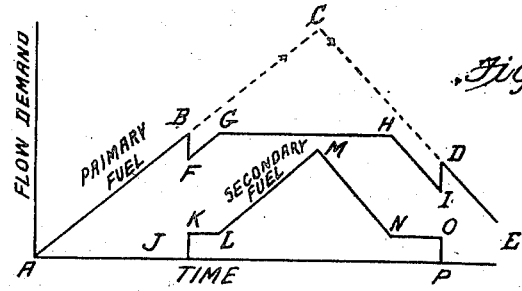
Inventor
H. Ziebolz.
By A. D. Adams
Attorney Patented Apr. 1, 1947

2,418,388

UNITED STATES PATENT OFFICE 2,418,388

APPARATUS FOR CONTROLLING PRIMARY AND SECONDARY FUELS

Herbert Ziebolz, Chicago, Ill., assignor to Askania Regulator Company, Chicago, Ill., a corporation of Illinois Application May 25, 1943, Serial No. 488,425

13 Claims. (Cl. 236—26)

This invention relates to a method of and apparatus for controlling primary and secondary fuels in commercial furnace installations having provision for a definite, minimum flow rate of the secondary fuel when the primary fuel is inadequate to supply the heat demand.

In commercial furnace installations employing multiple fuels, it sometimes becomes necessary to start the secondary fuel at a definite minimum flow rate, because ordinary burners cannot handle less than a predetermined minimum. At the same time, it is desirable that the heat input to the furnace shall be a substantially continuous function of the demand and that the contro's shall be stable. Obviously, if the primary fuel reaches its maximum available flow and a relatively large allowable, minimum, secondary, fuel flow is cut in or turned on to satisfy a small increase in demand, the heat input to the furnace would greatly exceed the demand, thereby overheating the furnace, and, in general, wou'd lead to undesired conditions in the furnace. Conversely, if the minimum, allowable secondary fuel flow is cut off when the demand falls just below the available supply of primary fuel plus the minimum, allowable secondary fuel flow, the heat input to the furnace would be less than the demand, thereby causing the furnace temperature to drop excessively and again the results would be unsatisfactory. Moreover, the control mechanism ould hunt when these change-over points are reached and, in general, the control could be said to be unstable. It is therefore the main object of this invention to provide a novel method and means whereby the primary and secondary fuels are so controlled that the heat input to a furnace may be maintained as a substantially continuous function of the demand. For example, the idea is to turn on a supply of secondary fuel at a minimum flow rate when the primary fuel cannot meet the demand and simultaneously reduce the supply of primary fuel by an amount which will permit the secondary fuel to continue to flow as long as there is a deficiency of primary fuel and without upsetting the heat input to the furnace. Furthermore, as the demand decreases, so that it can be met by the supply of primary fuel, the idea is to cut off the added supply of secondary fuel and immediately increase the supply of primary fuel by an equivalent amount.

Other aims and advantages of the invention will appear in the specification, when considered in connection with the accompanying drawings, wherein:

Fig. 2 is a sectional view on an enlarged scale of a differential gearing shown in Fig. 1;

Fig. 3 is an electrical wiring diagram embodying parts of the operating mechanism shown in Fig. 1; and Fig. 4 is a graph illustrating primary and secondary fuel flows.

Figure 1:
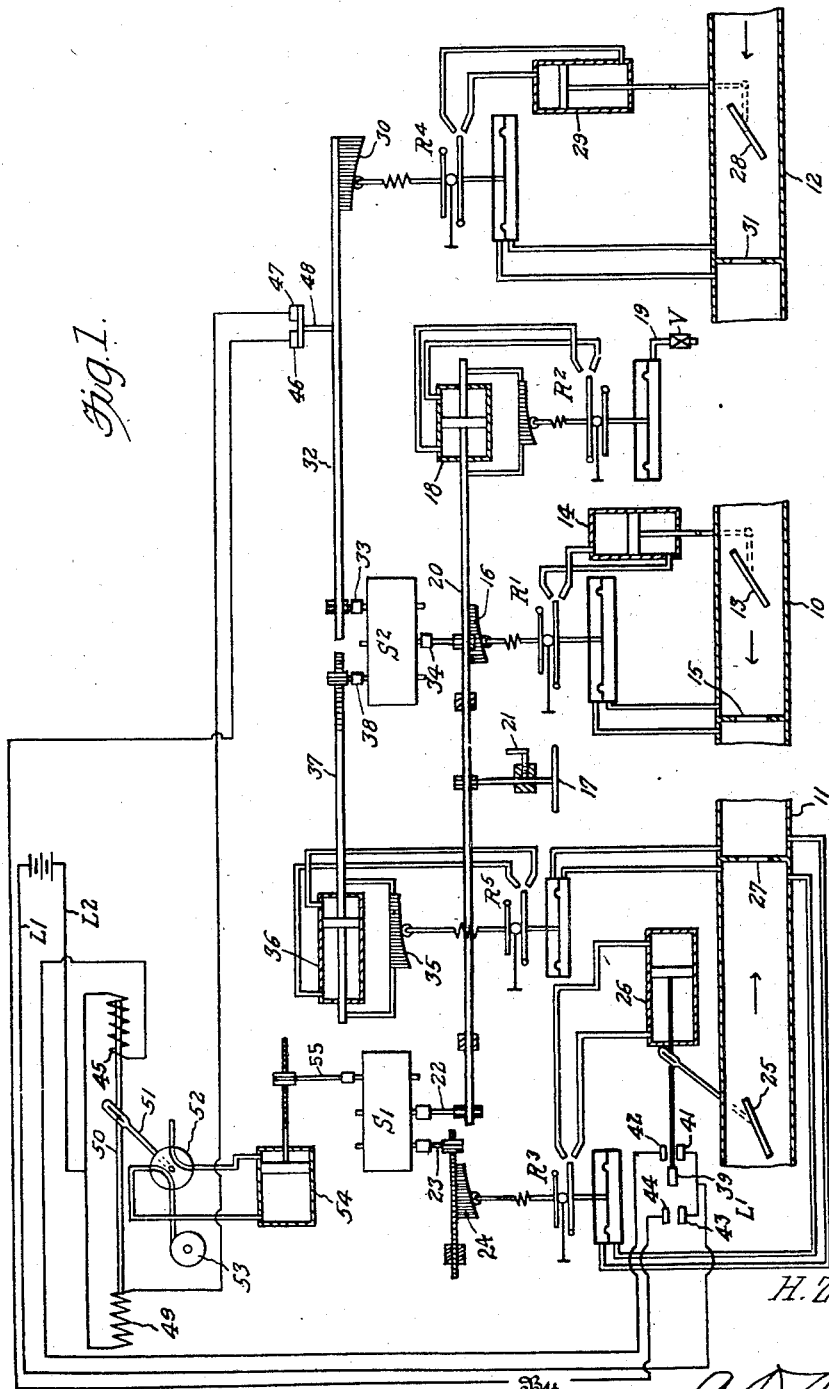
Fig. 1 is a diagrammatic illustration of one form of apparatus employed in practicing the invention.

Referring particularly to the drawings, the invention may be explained by reference to the graph shown in Fig. 4, wherein the flows of the primary and secondary fuels are illustrated as a function of time and assuming that the demand increases and then decreases as a linear function of time. However, the demand can be any function of time. This linear relation is adopted to simplify an explanation of the method. As shown by the graph, the curve ABCDE represents the demand for fuel; the curve ABFGHIDE represents the flow of primary fuel and curve JKLMNOP the flow of secondary fuel to satisfy the deficiency in primary fuel. The point "B" in the curve ABC represents the maximum available primary fuel at that particular time. As the furnace demand increases beyond this point, it has to be satisfied by an increase in total fuel provided by the primary fuel and the secondary fuel. When the demand thus exceeds the available primary fuel flow, the minimum allowable flow of secondary fuel is cut in and is represented by the vertical portion JK of the secondary fuel curve. Simultaneously, the primary fuel flow is decreased by an amount BF which is equivalent to the flow JK. As soon as the secondary fuel comes on or is cut in, its flow will remain constant until the maximum available flow of primary fuel is again reached. The primary fuel flow increases along the line FG to its maximum rate of flow and then remains constant, as shown by the horizontal line GH; while the flow of the secondary fuel increases along the line LM to satisfy any further increase in the heat demand until the maximum demand is reached. The secondary fuel continues to supply the demand, as the demand decreases along the line CD, until the available supply of primary fuel is again sufficient to take care of the decreased demand. Then, the flow of secondary fuel becomes constant, as represented by the line NO; while a further decrease in the demand is satisfied by a decrease in the primary fuel flow, represented by the line HI. At this point, or when the decrease in primary fuel flow reaches a predetermined value equal to or greater than the equivalent of the minimum allowable secondary fuel flow, the secondary fuel shuts off, as represented by the line OP. Simultaneously, the primary fuel flow increases by an equivalent amount, as represented by the line ID. Thereafter, any further decrease in demand is satisfied by a decrease in the primary fuel flow, as represented by the line DE.

Obviously, the transition at the point "B" must take place each time the demand increases and exceeds the available primary fuel equivalent. The transition at the point "D" will take place each time the demand decreases and is diminished the equivalent of some predetermined flow of the secondary fuel.

Referring now to the apparatus for practicing the method, there is illustrated in Fig. 1 a mechanical control system embodying summarizing gears employed to effect the double change-overs or transitions described in connection with the graph. The summarizing apparatus may be and preferably is somewhat similar to that shown in my application Ser. No. 401,666, Patent No. 2,345,520, March 28, 1944. However, it is to be understood that other apparatus may be employed for this purpose.

In the illustrated example, it will be assumed that the operation is represented by the line AB in Fig. 4 and that controlled air is supplied to a furnace, not shown, through a conduit 10 and the total supply of air, which represents the required total heat input to the furnace is used to control the supply of primary and secondary fuels to the burner installation of the furnace through conduits 11 and 12, respectively. The air input to the furnace may be controlled to supply the heat demand either manually or automatically. In this instance, there is shown a butterfly valve 13 in the air conduit 10 which is controlled by a jet pipe regulator R1 of a well known type, having a servo-motor 14 connected to the valve. The regulator responds to changes in differential pressure obtained on opposite sides of a constriction 15 in the air conduit, acting on the jet pipe through an ordinary diaphragm, said differential pressure being counteracted by spring loading cam 16 which is set in accordance with the total air demand. The arrangement is such that the adjusting movements of the cam are proportional to the flow of air throughout the range of the cam movement. These adjustments can be made either by a hand wheel 17 or by a servo-motor 18 operated by a second jet pipe regulator R2 which is connected to an ordinary master regulator, not shown, responsive to total heat demand of a furnace, or to changes in a boiler load. In this instance, a fluid conduit 19 leading from the master regulator to the diaphragm chamber of the regulator R2 has a cut-off valve V to permit manual setting of the loading cam 16.

A predetermined amount of air, which represents the heat input demand is called for by the setting of the air cam 16 which is carried by a slidable bar or link 20 connected to the servo-motor 18 of the regulator R2, as well as to the operating hand wheel 17. In this instance, the setting hand wheel 17 is shown as being connected by a rack and pinion arrangement to operate the link 20 and the loading cam. It can be locked in position by a set screw 21 or any other suitable means. However, it will be understood that the set screw will be released when the loading cam is controlled automatically by the regulator R2. The loading cam is moved to the right to take care of any increase in demand for air. The link 20 is likewise connected by suitable gearing to a shaft 22 of a differential or summarizing gear S1 having another shaft 23 connected to operate a movable spring loading cam 24 of a primary fuel jet pipe regulator R3. For an increase in demand, link 20 moves to the right, shaft 22 turns clockwise, shaft 23 counterclockwise and cam 24 moves to the right. For a decrease in demand, contrary movements take place. Incidentally, the differential gear is similar to that shown in my aforesaid copending application, Ser. No. 401,666, an example being illustrated in Fig. 2.

The flow of the primary fuel is shown as being controlled by a butterfly valve 25 which is operated by the servo-motor 26 of the regulator R3, the pressure exerted by the cam 24 being opposed by differential pressure impulses derived from opposite sides of a constriction 27 in the fuel conduit 11 and acting through the usual regulator diaphragm.

The flow of the secondary fuel in conduit 12 is shown as being controlled by a butterfly valve 28 operated by the servo-motor 29 of a jet pipe regulator R4 and the setting of this valve is determined by the position of a movable spring loading cam 30, which is opposed by differential pressure impulses derived from opposite sides of a constriction 31 in the secondary fuel conduit acting through the usual regulator diaphragm. It will be understood that the butterfly valve 28 remains closed when the primary fuel flow is adequate to take care of the demand.

The secondary fuel cam 30 is likewise connected to be displaced by movements of the air loading cam 16 in response to the total demand. In this instance, the cam is connected by a link 32 and suitable gearing to a shaft 33 of a differential or summarizing gear S2 which has a shaft 34 connected by a rack and pinion to the link 20. For an increase in demand, link 20 moves to the right, shaft 34 turns clockwise, shaft 33 counterclockwise and link 32 and cam 30 move to the left. However, the displacement of the secondary fuel cam is adapted to be offset or cancelled by a displacement which represents the primary fuel flow as long as the primary fuel flow is sufficient to meet the demand. In this instance, impulses derived from opposite sides of the constriction 27 in the primary fuel conduit act through the usual diaphragm on the jet pipe of a regulator R5 having a movable spring loading cam 35 and a servo-motor 36 to impart movements or displacements to a link 37 representing the primary fuel flow and this link is connected to a third shaft 38 of the differential gear S2. These movements are imparted through the differential gear S2 to the link 32 and the secondary fuel cam 30. Thus, the net displacement of the cam represents the difference between the total load demand and the primary fuel flow. When the primary fuel flow is sufficient to meet the demand, the net displacement of the secondary fuel cam is zero and the valve 28 is closed. However, the regulator R5 will operate the secondary fuel cam when the primary fuel flow fails to meet the demand, when condition B in Fig. 4 is reached.

When the supply of primary fuel fails to meet an increased demand, the jet pipe will swing downwardly, due to the spring pressure imparted by the loading cam, and the servo-motor 26 will be operated so that its piston moves to the extreme right hand position, fully opening the butterfly valve 25. The piston of the servo-motor is shown as having a piston rod connected to the butterfly valve and also to move a contact member 39. The contact member 39 is shown as coacting with spaced pairs of contacts 41—42 and 43—44. Contacts 41—42 coact with 39 substantially at the end of the stroke. Contacts 43—44 coact with 39 at some movable and predetermined position, usually intermediate the two ends of the stroke. In fact, contacts 43—44 will be placed according to existing control conditions, so that contact will be made with 39 when ample primary fuel is available to absorb the minimum allowable secondary flow. The contacts 41—42 are connected through lines L—1 and L—2 to control the circuit of a valve operating solenoid 45, closing said circuit when the bridging contact member 39 is moved by servo-motor 26 to its extreme right-hand position (Fig. 3).

The contacts 43—44 are shown as being connected in series with a pair of contacts 46—47 adapted to be bridged by a contact member 48 carried by the link 32 when the secondary fuel cam 30 is moved to its initial, minimum valve-opening position. These contacts are likewise connected through lines L—1 and L—2 to control the circuit of a second valve-operating solenoid 49. In this example, the solenoids 45 and 49 act through a core, in the form of a rod 50, and a slotted crank-arm 51 to operate a four-way valve 52, so that it will supply operating fluid from a pump 53 to a servo-motor 54. The servo-motor is connected by a rack and pinion to actuate a third shaft 55 of the summarizing gear S1. The arrangement is such that, as soon as the primary fuel fails to meet the demand and the solenoid 45 is energized, the piston of servo-motor 54 will be operated to subtract a movement from the primary fuel loading cam 24 or move it to the left a distance representing the minimum, allowable secondary fuel flow. Thus, contact 41—42 having been made, solenoid 45 is energized, placing valve 52 in the position shown and moving piston of servo-motor 54 to the right and turning shaft 55 counterclockwise and shaft 23 clockwise, thus moving cam 24 to the left. This causes the jet pipe of the regulator R3 to swing upwardly and operate the piston of servo-motor 26, moving it slightly to the left and partially closing the butterfly valve 25. This is interpreted as a decrease in demand and cuts off just enough primary fuel to allow for the minimum flow of the secondary fuel. Then, the regulator R5 measures the decreased flow through constriction 27 and the servo-motor 36 displaces the secondary fuel cam 30 to the loading position shown in Fig. 1, moving the bridging contact element 48 to its bridging position. The cam 35 and link 37 have moved left, turning shaft 38 clockwise and shaft 33 counterclockwise, thus moving link 32 and cam 30 to the left. This corresponds to point F in Fig. 4.

When the parts are in the position shown in Fig. 1, with the secondary fuel supplied at its minimum permissible flow rate, the primary fuel flow will again increase to its maximum available rate or from the point "F" to the point "G" in the graph of Fig. 4. Thereafter, and as long as the primary fuel flow rate is inadequate to take care of the total demand, the rate of flow of the secondary fuel will vary to make up for changes in the demand.

If the demand decreases below the point where the minimum allowable secondary flow is required, point H in Fig. 4, the primary fuel cam 24 will move to the left upon a decrease in demand. At some movable and predetermined point, the rate of flow of primary fuel will exceed the demand by an amount substantially more than the equivalent of the minimum allowable rate of flow of secondary fuel, and contact 39 will coact with contacts 43—44, thus closing the circuit through line conductors L1 and L2 to the second solenoid 49. This solenoid will immediately move the link or core 50 to the left and operate the valve 52, so that the piston of servo-motor 54 will move to its extreme left-hand or starting position. This imparts added movement to the loading cam 24, moving it to the right, so that it calls for more primary fuel than was called for by its position before the secondary fuel was cut off; that is, when the piston of the servo-motor 54 moves to the left, shaft 55 turns clockwise, shaft 23 counterclockwise, causing cam 25 to move to the right. This added movement imparted to the cam 24 will increase the spring pressure and overcome the differential pressure impulse, acting through the diaphragm on the opposite side of the jet pipe, and cause the jet pipe to swing downwardly momentarily and operate the servo-motor 26 to open the butterfly valve 25 wider than it was before. This is interpreted as an increase in demand and the increased flow of primary fuel is measured by the regulator R5. The servo-motor 36 then imparts right-hand displacing movement to the secondary fuel cam 30 and cuts off the flow of secondary fuel. After this happens, the primary fuel continues to supply the demand as long as it can meet it. When it fails to meet the demand, as initially explained, the cycle of operations is repeated.

It is not necessary to explain in great detail the summarizing or differential gearing employed in the illustrative embodiment. However, Fig. 2 is a sectional view corresponding generally with that shown in my aforesaid copending application, Ser. No. 401,666. This type of gear is shown as being designed to be used interchangeably. Its shafts may be connected to any desired operating or operated elements. In this example, shafts 56 carry spur gears 57 meshing with spur gears 58 carrying bevel gears 59 which coact with planetary gears 60 secured to a central shaft 61.

In the wiring diagram shown in Fig. 3, it will be understood that the position of the contact 39, operated by the servo-motor 26, is only momentary. As soon as the contact reaches that position, the solenoid 45 acts through the summarizing gearing S1 to decrease the spring pressure exerted by the loading cam 24 and this permits the regulator R3 to operate the servo-motor 26 and move the contact 39 to the left of its circuit closing position.

It will be understood that all of the loading cams may be of adjustable contour to permit variations in the proportions of air to fuel flows or the proportion of the controlled air supply to the total amount of air represented by the adjusting movement for each increment of their movements. Furthermore, the regulators have the usual ratio varying elements to change the percentage of air to fuel, etc. all as clearly explained in my copending application Ser. No. 401,666.

Reviewing the operation of the mechanism and assuming an initial increase in the load or demand, the increase will increase the pressure in 19, causing the motor 18 to move the bar 20 to the right. Summarizing gear S1 moves loading cam 24 to the right, operating the motor 26 to open primary fuel valve 25 in proportion to the demand. Movement of the bar 20 to the right also operates through summarizing gear S2 to move bar 32 to the left, but an increase in the pressure difference across the baffle or restriction 27 in the primary fuel line will cause motor 36, acting through the bar 37 and summarizing gear S2, to move bar 32 simultaneously back to the right to nullify such movement to the left, thereby retaining the secondary fuel valve 28 closed. In other words, the arrangement is such that the bars 32 and 37 will operate substantially simultaneously to nullify any loading movement on the cam 30 for the secondary valve when the supply of primary fuel is sufficient to meet the demand.

Further or continued increase in demand, causes piston to move farther and farther to the right until the maximum limit of the opening movement of the primary fuel supply valve 25 is reached, at which time switch 41, 42 is closed. This energizes solenoid 45, causing valve 52 to operate motor 54 and move its piston to the right, rotating the shaft 55 counter-clockwise and the shaft 23 clockwise and thereby moving the loading cam 24 to the left. This causes the motor 36 to move the bar 37 to the left, which, through the summarizing gear S2, causes the bar 32 and secondary loading cam 30 to move to the left, thereby opening the secondary fuel valve 28 and, at the same time, closing the contacts 46, 47.

In response to a further increase in load, the bar 20 moves still farther to the right, moving cam 24 to the right and bringing the primary fuel valve 25 again toward its wide open position. Until this valve reaches its wide open position, the secondary full valve 28 is prevented from opening any wider by the counterbalancing or counteracting effect of motor 36 on bar 32. After the primary fuel valve 25 is wide open, the nullifying action ceases and the secondary fuel valve 28 opens as the load increases.

It will be understood that the operation is reversed in response to decreases in load or demand.

From the foregoing description, it will be seen that the novel method involves automatic control of both primary and secondary fuel and eliminates any possibility of hunting or overheating and underheating a furnace. It provides for turning on and off the secondary fuel and for operating a burner with a predetermined or minimum flow of such fuel. After the cams are initially adjusted to proportion the air and the particular fuels in accordance with variations in the total heat input air or demand, the system is entirely automatic and requires no expert attention.

Obviously, the method is not limited to the particular embodiment herein described. Moreover, the apparatus is capable of a variety of changes within the scope of the appended claims.

What is claimed is:

1. Apparatus for controlling the supply of primary and secondary fuels to a furnace in accordance with a variable heat demand, comprising in combination, conduits for the respective fuels; an adjustable regulator connected to vary the flow of each fuel; load control means connected to adjust the regulators so that they will call for a flow of fuel which will meet the heat demand; means to measure the flow of the primary fuel connected to cancel the adjustment of the secondary fuel regulator when the primary fuel flow is sufficient to meet the demand and to impart adjusting movement thereto when the primary fuel flow is insufficient to meet the demand; and automatic means connected to be operated in response to initial adjustment of the secondary fuel regulator calling for a minimum flow of secondary fuel after the maximum flow of primary fuel has failed to meet the demand and also connected to decrease the maximum adjustment of the primary fuel regulator by an amount allowing for a predetermined minimum flow of the secondary fuel.

2. Apparatus for controlling the supply of primary and secondary fuel to a furnace in accordance with the heat demand, comprising in combination, conduits for the respective fuels; an adjustable regulator controlling the flow of each of the fuels; displaceable and adjustable load control means connected to impart adjusting movements to each regulator; means responsive to the flow of the primary fuel connected to cancel the adjustment of the secondary fuel regulator when the supply of primary fuel is sufficient to meet the demand and to impart adjusting movement thereto when the supply of primary fuel is insufficient to meet the demand; and means responsive to an initial adjustment of the secondary fuel regulator connected to reduce the flow of the primary fuel by a predetermined amount after it has failed to meet the demand, thereby causing the means responsive to the flow of primary fuel to adjust the secondary fuel regulator to call for a minimum flow of secondary fuel equivalent to the reduction in flow of the primary fuel.

3. Apparatus, as set forth in claim 2, wherein the primary fuel regulator restores the maximum available flow of primary fuel in response to an increase in demand after the minimum flow of secondary fuel is turned on; and the secondary fuel regulator is then adjusted to call for sufficient fuel to meet the increased demand.

4. Apparatus, as set forth in claim 2, wherein each regulator includes a fluid jet pipe operating a servo-motor; and the adjustable load control means for each regulator is a movable spring loading cam.

5. Apparatus, as set forth in claim 1, wherein said measuring means comprises a jet pipe regulator including a servo-motor connected to counteract the adjustment of the secondary fuel regulator.

6. Apparatus, as set forth in claim 1, wherein the primary fuel regulator includes a jet pipe and the load control means for said primary fuel regulator comprises a movable spring loading cam acting thereon; and the means for changing the adjustment of the primary fuel regulator comprises a servo-motor acting on the loading cam.

7. Apparatus, as set forth in claim 2, wherein the regulator for each fuel is operated by a fluid jet pipe having an adjustable spring loading cam acting thereon; and the means responsive to flow of the primary fuel comprises a regulator having a servo-motor operatively connected to the adjusting means for the secondary regulator.

8. Apparatus, as set forth in claim 1, wherein the primary fuel regulator comprises a movable jet pipe which operates a servo-motor, and the adjusting load control means for said primary fuel regulator includes a spring loading cam acting on the jet pipe in opposition to differential pressure impulses derived from the primary fuel flow; and the automatic means for decreasing the adjustment of the primary fuel regulator comprises a servo-motor connected to actuate the spring loading cam.

9. Apparatus, as set forth in claim 1, wherein the primary fuel regulator comprises a movable jet pipe which operates a servo-motor, the adjusting load control means for said primary fuel regulator including a spring loading cam acting on the jet pipe in opposition to differential pressure impulses derived from the primary fuel flow.

10. Apparatus, as set forth in claim 1, wherein an adjustable regulator is connected to control the supply of air to a furnace in accordance with the heat demand and the adjusting load control means for said primary fuel regulator for the air regulator is connected to impart the adjustments to the respective fuel regulators.

11. Apparatus for controlling the supply of primary and secondary fuel to a furnace in accordance with a variable heat demand, comprising conduits for the respective fuels; an adjustable regulator controlling the flow of each of the fuels; a jet pipe regulator controlling the flow of air to the furnace in proportion to the heat demand and having an adjustable loading cam; means connected to adjust the air loading cam; means connecting the air loading cam to adjust the respective fuel regulators; means for measuring the flow of primary fuel connected to cancel the adjustment of the secondary fuel regulator when the flow of primary fuel is sufficient to meet the demand and to impart adjusting movement thereto when the flow of primary fuel is insufficient to meet the demand; and a servo-motor connected to be operated in response to an initial adjustment of the secondary fuel regulator after the supply of primary fuel fails to meet the demand and also connected to change the adjustment of the primary fuel regulator so that it will call for a reduced flow of primary fuel corresponding to a predetermined minimum flow of secondary fuel, thereby causing the means for measuring the flow of the primary fuel to impart a corresponding adjustment to the secondary fuel regulator.

12. Apparatus, as set forth in claim 11, wherein the air cam, the flow measuring means for the primary fuel and the secondary fuel regulator are all connected to a common differential gear.

13. Apparatus, as set forth in claim 8, wherein said servo-motor operated in response to the initial adjustment of the secondary fuel regulator is controlled by a solenoid operated valve and the circuit is controlled in response to changes in the heat demand represented by adjustments of the primary fuel regulator relative to the available supply of said fuel.

HERBERT ZIEBOLZ.

REFERENCES CITED

The following references are of record in the file of this patent:

UNITED STATES PATENTS

| Number | Name | Date |
|---|---|---|
| 1,797,586 | Peebles | Mar. 24, 1931 |
| 2,025,629 | Wunsch | Dec. 24, 1935 |
| 2,166,077 | Spitzglass | July 11, 1939 |
| 2,259,417 | Gorrie | Oct. 14, 1941 |
| 1,281,316 | Elliott | Oct. 15, 1918 |
| 2,150,113 | Wunsch et al. | Mar. 7, 1939 |
| 2,169,174 | Ziebolz et al. | Aug. 8, 1939 |
| 2,169,175 | Ziebolz et al. | Aug. 8, 1939 |